United States Patent
Ishikawa et al.

(10) Patent No.: US 9,371,009 B2
(45) Date of Patent: Jun. 21, 2016

(54) MOUNT STRUCTURE FOR FUEL CELL STACK

(71) Applicant: HONDA MOTOR CO., LTD., Minato-Ku, Tokyo (JP)

(72) Inventors: Choichi Ishikawa, Utsunomiya (JP); Ryoichi Yoshitomi, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/638,213

(22) Filed: Mar. 4, 2015

(65) Prior Publication Data

US 2015/0251560 A1 Sep. 10, 2015

(30) Foreign Application Priority Data

Mar. 6, 2014 (JP) .................................. 2014-043399

(51) Int. Cl.
| | |
|---|---|
| *B62D 21/15* | (2006.01) |
| *B60L 11/18* | (2006.01) |
| *H01M 8/02* | (2016.01) |
| *H01M 8/24* | (2016.01) |
| *H01M 8/10* | (2016.01) |

(52) U.S. Cl.
CPC ......... *B60L 11/1898* (2013.01); *B60L 11/1896* (2013.01); *B62D 21/15* (2013.01); *B62D 21/152* (2013.01); *H01M 8/0273* (2013.01); *H01M 8/2465* (2013.01); *H01M 8/2475* (2013.01); *B60L 2270/145* (2013.01); *H01M 2008/1095* (2013.01); *H01M 2250/20* (2013.01); *Y02T 90/34* (2013.01)

(58) Field of Classification Search
CPC ... B60L 11/1896; B60L 11/1898; B60K 5/10; B60K 5/1275; B60K 28/14; H01M 8/0273; H01M 8/2465; H01M 8/2475; H01M 2250/20; Y02T 90/34; B62D 21/15; B62D 21/152; B62D 21/155
USPC ........................................................ 180/232
See application file for complete search history.

(56) References Cited

U.S. PATENT DOCUMENTS

| | | | | |
|---|---|---|---|---|
| 3,347,501 A | * | 10/1967 | Van Eimeren | B60K 5/1241 180/232 |
| 6,298,936 B1 | * | 10/2001 | Yoshida | B60K 5/1216 180/232 |
| 7,144,039 B2 | * | 12/2006 | Kawasaki | B60K 1/04 180/232 |
| 7,380,829 B2 | * | 6/2008 | Kishima | B62D 21/155 180/232 |
| 7,393,016 B2 | * | 7/2008 | Mitsui | B62D 25/08 180/232 |
| 7,588,117 B2 | * | 9/2009 | Fukuda | B60K 1/00 180/291 |
| 7,594,559 B2 | * | 9/2009 | Kitoh | B62D 21/155 180/232 |
| 8,356,687 B2 | * | 1/2013 | Baumann | B60R 21/0134 180/232 |
| 8,459,399 B2 | * | 6/2013 | Ohashi | B62D 21/00 180/312 |
| 8,540,282 B2 | * | 9/2013 | Yoda | B60K 1/04 180/232 |
| 8,893,843 B2 | * | 11/2014 | Hayano | B60L 15/007 180/232 |

(Continued)

FOREIGN PATENT DOCUMENTS

JP 08-192639 A 7/1996

*Primary Examiner* — Barry Gooden, Jr.

(74) *Attorney, Agent, or Firm* — Carrier Blackman & Associates, P.C.; Joseph P. Carrier; William D. Blackman

(57) ABSTRACT

A mount structure includes side mounts for holding a fuel cell stack to thereby fix the fuel cell stack to first vehicle frames, and rear mounts for fixing the fuel cell stack to a second vehicle frame. The strength of the side mounts is lower than the strength of the rear mounts. In the structure, when an external load is applied to a fuel cell electric vehicle, the side mounts are broken prior to breakage of the rear mounts.

6 Claims, 10 Drawing Sheets

(56) References Cited

U.S. PATENT DOCUMENTS

| | | | | |
|---|---|---|---|---|
| 2004/0090085 A1* | 5/2004 | Kawasaki | B60K 1/04 | 296/187.09 |
| 2006/0181071 A1* | 8/2006 | Mitsui | B62D 21/155 | 280/784 |
| 2006/0255625 A1* | 11/2006 | Kitoh | B62D 21/155 | 296/204 |
| 2010/0101885 A1* | 4/2010 | Nozaki | B60K 1/00 | 180/232 |
| 2010/0147608 A1* | 6/2010 | Okabe | B60K 1/04 | 180/65.31 |
| 2011/0198832 A1* | 8/2011 | Takeshita | B62D 21/155 | 280/784 |
| 2011/0316295 A1* | 12/2011 | Yamada | B62D 21/155 | 293/132 |
| 2012/0006607 A1* | 1/2012 | Ohashi | B60K 1/04 | 180/65.31 |
| 2012/0015257 A1* | 1/2012 | Arisawa | B60K 1/04 | 429/400 |
| 2012/0021301 A1* | 1/2012 | Ohashi | B60K 1/04 | 429/400 |
| 2012/0080251 A1* | 4/2012 | Ohashi | B60K 1/04 | 180/65.31 |
| 2013/0220718 A1* | 8/2013 | Gotou | B60K 1/00 | 180/65.6 |
| 2013/0270862 A1* | 10/2013 | Hotta | B62D 21/155 | 296/187.09 |
| 2014/0084627 A1* | 3/2014 | Yamanaka | H01M 2/1083 | 296/187.09 |
| 2014/0159420 A1* | 6/2014 | Hashimoto | B62D 21/152 | 296/187.1 |
| 2014/0203543 A1* | 7/2014 | Onishi | B62D 21/155 | 280/784 |
| 2014/0367182 A1* | 12/2014 | Yoshinaga | B60L 11/1898 | 180/68.4 |
| 2015/0021114 A1* | 1/2015 | Hotta | B60K 1/00 | 180/279 |
| 2015/0027796 A1* | 1/2015 | Naito | B60K 1/04 | 180/65.31 |
| 2015/0083507 A1* | 3/2015 | Keller | B60K 1/04 | 180/68.5 |
| 2015/0244006 A1* | 8/2015 | Yoshitomi | H01M 2/00 | 429/446 |
| 2015/0314742 A1* | 11/2015 | Kato | B62D 21/152 | 293/155 |
| 2015/0375622 A1* | 12/2015 | Yamanaka | B60K 1/00 | 180/65.1 |
| 2016/0046326 A1* | 2/2016 | Jung | B62D 25/082 | 180/312 |

* cited by examiner

MOUNT STRUCTURE FOR FUEL CELL STACK

CROSS-REFERENCE TO RELATED APPLICATION

This application is based upon and claims the benefit of priority from Japanese Patent Application No. 2014-043399 filed on Mar. 6, 2014, the contents of which are incorporated herein by reference.

BACKGROUND OF THE INVENTION

1. Field of the Invention

The present invention relates to a mount structure for mounting a fuel cell stack in a fuel cell vehicle. The fuel cell stack is formed by stacking a plurality of fuel cells for generating electrical energy by electrochemical reactions of a fuel gas and an oxygen-containing gas.

2. Description of the Related Art

For example, a solid polymer electrolyte fuel cell employs a membrane electrode assembly (MEA) which includes an electrolyte membrane of a polymer ion exchange membrane, an anode provided on one side of the electrolyte membrane, and a cathode provided on the other side of the electrolyte membrane. The membrane electrode assembly is sandwiched between a pair of separators to form a power generation cell. In use, in the fuel cell, generally, a predetermined number of power generation cells are stacked together to form a fuel cell stack, e.g., mounted in a fuel cell vehicle (fuel cell electric automobile, etc.).

In the fuel cell vehicle, it is required to suitably protect the fuel cells when an external load is applied to the fuel cells due to vibrations, collisions, etc. during traveling of the vehicle. As a technique aimed to address this point, for example, a fuel cell system vehicle attachment structure disclosed in Japanese Laid-Open Patent Publication No. 08-192639 is known.

In the fuel cell system vehicle attachment structure, a cutout portion is formed in a frame side member provided in a front portion (motor room) of an electric vehicle. When a compression load is applied to the frame side member, the frame side member is subjected to compression deformation, while being bent so as to protrude upward at the cutout portion. That is, an energy absorbing portion for absorbing collision energy by deformation is provided.

A container case containing fuel cells is attached to the energy absorbing portion. A cutout portion and a groove are formed in the container case, so that the container case is bent to protrude upward when a compression load is applied to the container case. At the time of collision, the energy absorbing portion of the frame side member is bent and deformed to protrude upward, and the container case is deformed to be bent in the same direction as the energy absorbing portion. Further, the fuel cell is separated (divided) into two parts along the stack surface at its center, and thus broken to absorb part of the collision energy.

SUMMARY OF THE INVENTION

However, in Japanese Laid-Open Patent Publication No. 08-192639, it is difficult to reliably divide the fuel cells placed in the container case to absorb the shocks when a collision occurs. Further, at the time of collision, it is economically desired to protect the entire fuel cells without damaging the fuel cells.

The present invention has been made to solve this type of problem, and an object of the present invention is to provide a simple and economical mount structure for a fuel cell stack, in which it is possible to protect the fuel cell stack suitably from an external load.

The present invention relates to a mount structure for mounting a fuel cell stack in a fuel cell vehicle. The fuel cell stack is formed by stacking a plurality of fuel cells for generating electrical energy by electrochemical reactions of a fuel gas and an oxygen-containing gas. The fuel cell stack includes side mounts at both ends in a vehicle width direction, and a rear mount on a rear side in a vehicle longitudinal direction.

The fuel cell vehicle has first vehicle frames to which the side mounts are fixed, and a second vehicle frame provided below the fuel cell stack and to which the rear mount is fixed. The strength of the side mounts is lower than the strength of the rear mount such that the side mounts are broken prior to breakage of the rear mount when an external load is applied to the fuel cell vehicle.

In the present invention, the side mounts are fixed to the first vehicle frames, and the rear mount is fixed to the second vehicle frame. In the structure, in the fuel cell stack, it is possible to maintain the stable fixed state of the fuel cell stack, and reduce the number of components suitably and economically.

Further, when an external load is applied to the fuel cell vehicle, the side mounts can be broken prior to breakage of the rear mount. Therefore, in a state where the fuel cell stack is fixed to the second vehicle frame, the fuel cell stack can move easily in the horizontal direction.

Accordingly, with a simple and economical structure, it is possible to suitably protect the fuel cell stack when an external load is applied to the fuel cell stack.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
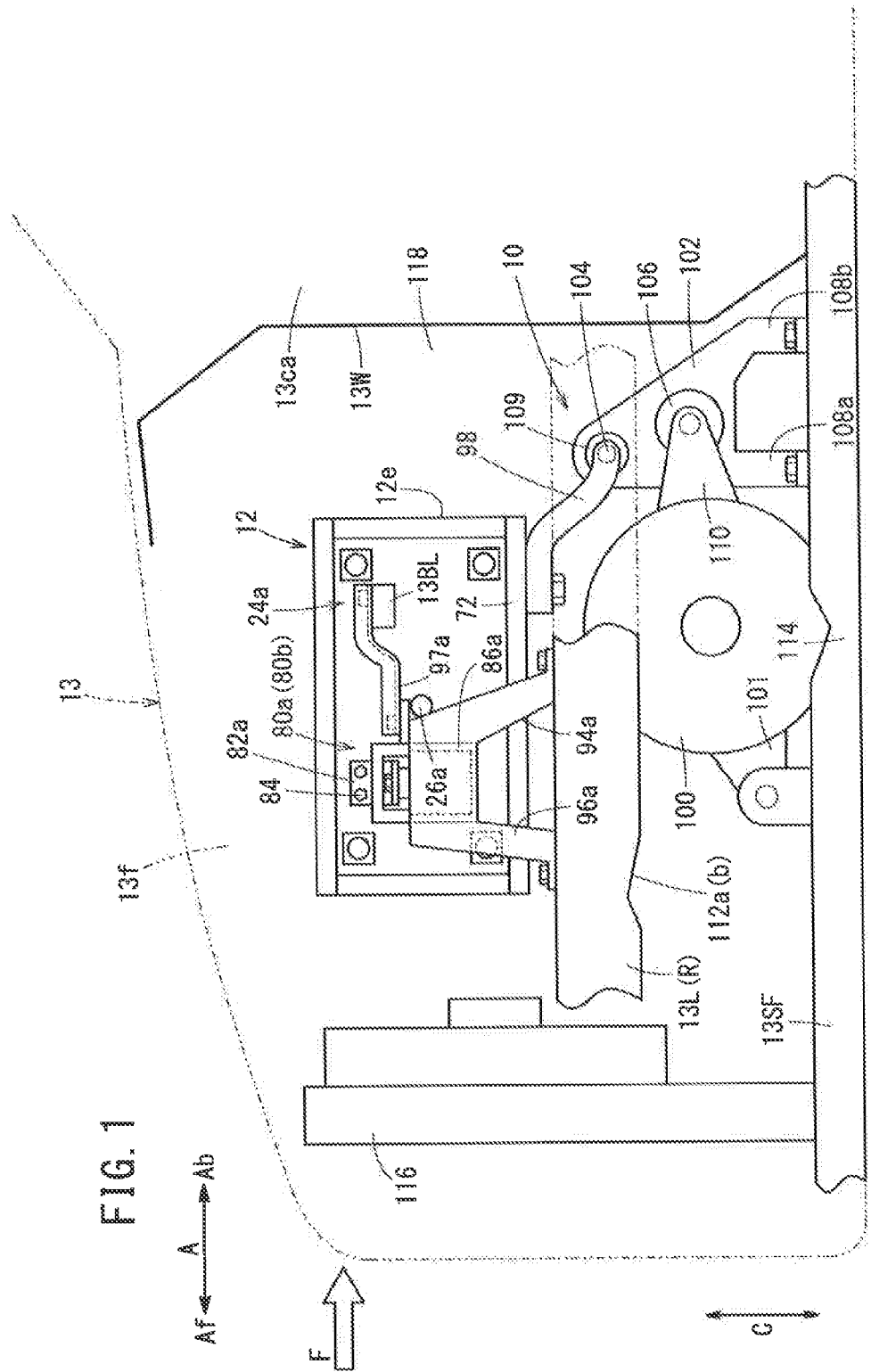
FIG. 1 is a schematic front side view showing a fuel cell electric vehicle equipped with a fuel cell stack to which a mount structure according to an embodiment of the present invention is applied.
Figure 2:
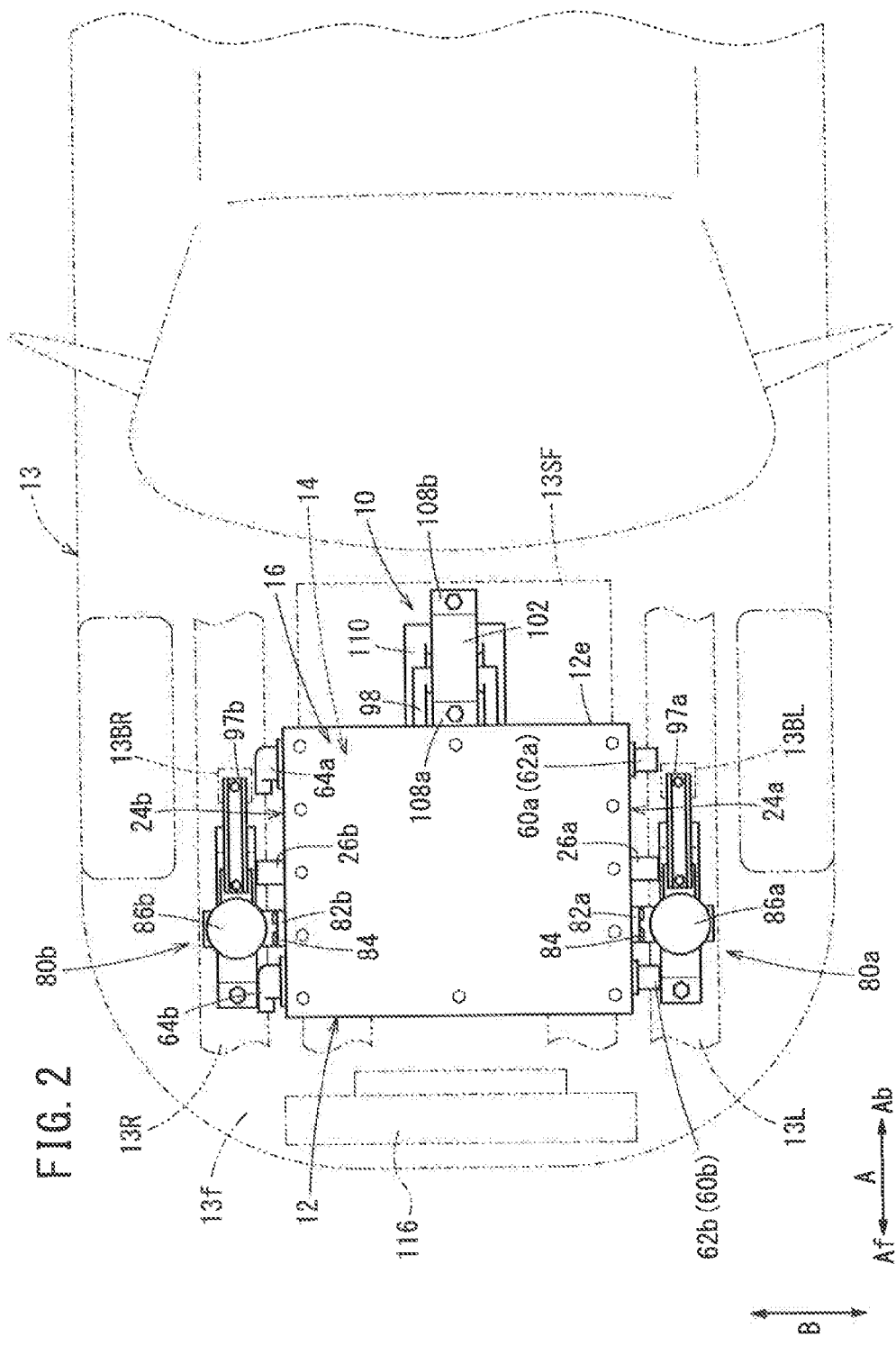
FIG. 2 is a schematic plan view showing the fuel cell electric vehicle.

As shown in FIGS. 1 and 2, a fuel cell stack 12 to which a mount structure 10 according to an embodiment of the present invention is applied is mounted in a motor room (front box) 13*f* of a fuel cell electric vehicle (fuel cell vehicle) 13. The motor room 13*f* is isolated from a vehicle compartment 13*ca* by a partition wall member (dash board) 13W.

Figure 3:
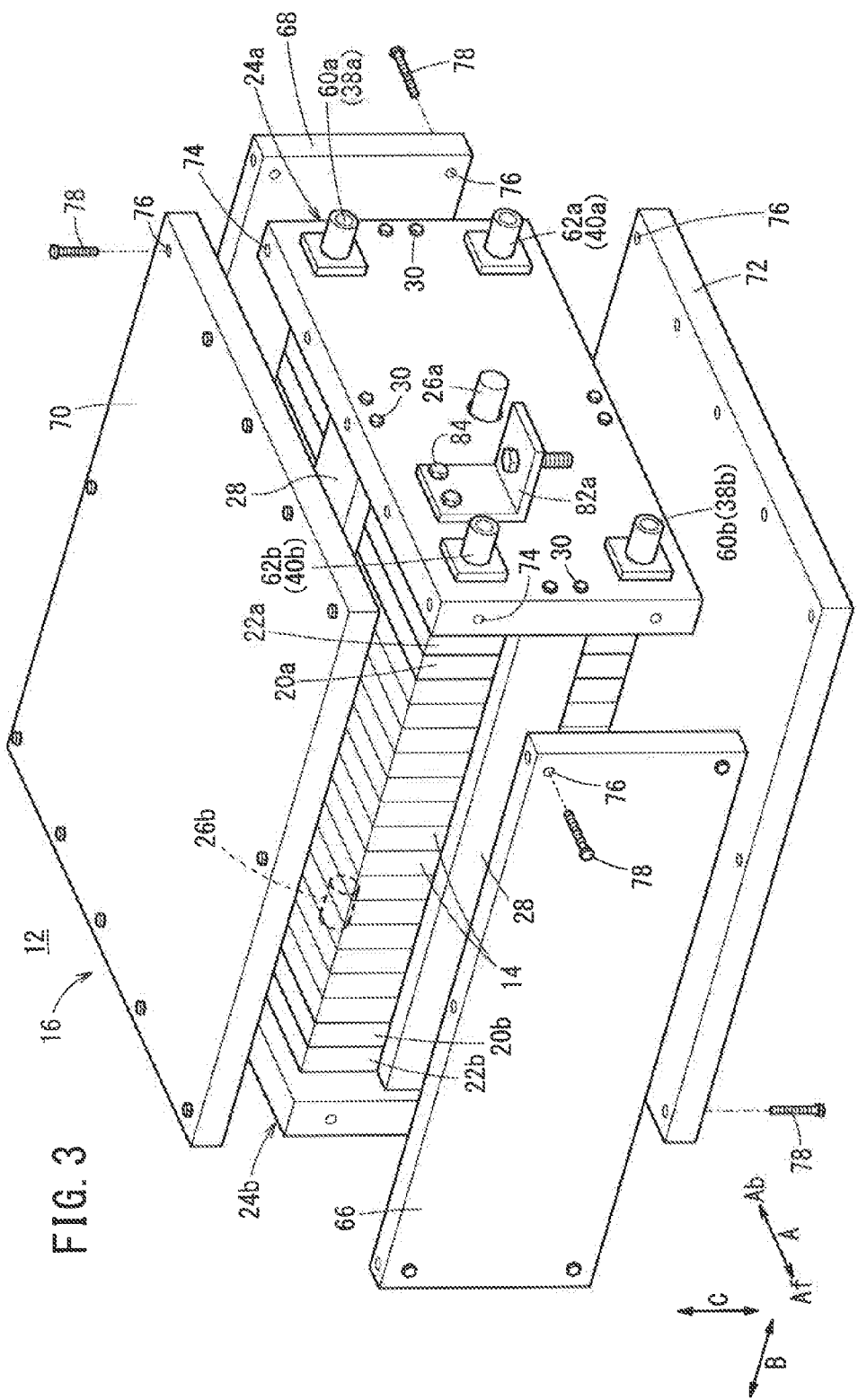
FIG. 3 is a partial exploded perspective view showing a casing containing the fuel cell stack.

As shown in FIGS. 2 and 3, the fuel cell stack 12 includes a plurality of stacked fuel cells 14 and a casing 16 containing the fuel cells 14. The casing 16 may be used as necessary. The casing 16 may not be used. As shown in FIG. 3, electrode surfaces of the fuel cells 14 are oriented upright, and the fuel cells 14 are stacked in a vehicle width direction of the fuel cell electric vehicle 13 indicated by an arrow B intersecting with a vehicle length direction (vehicle longitudinal direction) thereof indicated by an arrow A.

As shown in FIGS. 1 and 2, in the motor room 13*f*, first vehicle frames (e.g. side frames) 13R, 13L, which make up part of a vehicle body frame, extend in the direction indicated by the arrow A. The fuel cell stack 12 is mounted on the first vehicle frames 13R, 13L and a second vehicle frame 13SF described later. The fuel cell stack 12 may not be necessarily placed in the motor room 13*f*. For example, the fuel cell stack 12 may be placed under the vehicle floor at the central portion of the vehicle, or adjacent to a rear trunk.

As shown in FIG. 3, at one end of the fuel cells 14 in the stacking direction, a terminal plate 20*a* is provided. A first insulating plate 22*a* is provided outside the first terminal plate 20*a*, and a first end plate 24*a* is provided outside the first insulating plate 22*a*. At the other end of the fuel cells 14 in the stacking direction, a second terminal plate 20*b* is provided. A second insulating plate 22*b* is provided outside the second terminal plate 20*b*, and a second end plate 24*b* is provided outside the second insulating plate 22*b*.

A first power output terminal 26*a* extends outward from a substantially central position (or a position deviated from the central position) of the laterally elongated (rectangular) first end plate 24*a*. The first power output terminal 26*a* is connected to the first terminal plate 20*a*. A second power output terminal 26*b* extends outward from a substantially central position of the laterally elongated (rectangular) second end plate 24*b*. The second power output terminal 26*b* is connected to the second terminal plate 20*b*.

Coupling bars 28 each having a constant length are provided between the first end plate 24*a* and the second end plate 24*b* at central positions of sides of the first end plate 24*a* and the second end plate 24*b*. Both ends of the coupling bars 28 are fixed respectively to the first end plate 24*a* and the second end plate 24*b* by screws 30 to apply a tightening load to the stacked fuel cells 14 in the stacking direction indicated by the arrow B.

Figure 4:
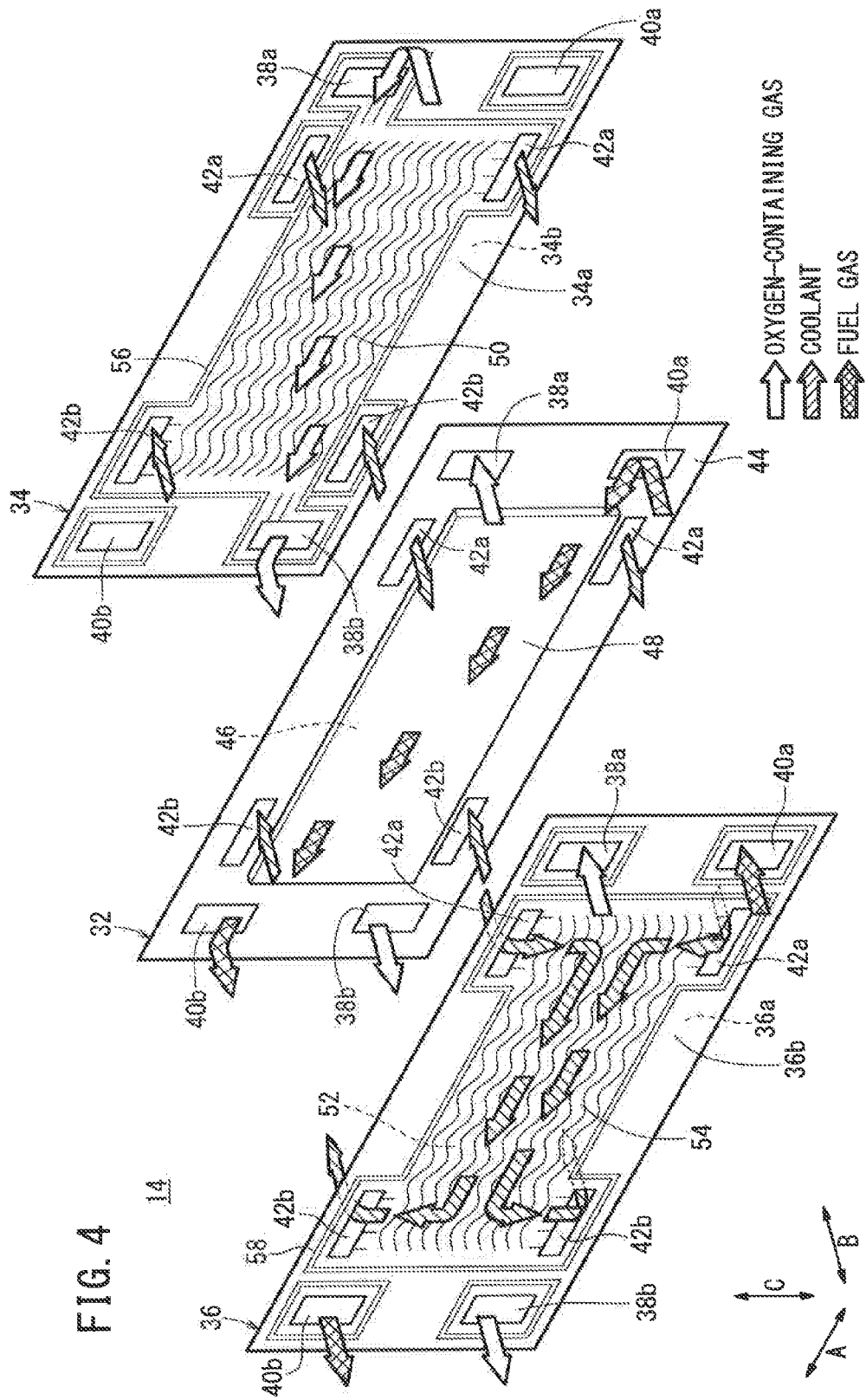
FIG. 4 is an exploded perspective view showing main components of a fuel cell of the fuel cell stack.

As shown in FIG. 4, the fuel cell 14 includes a membrane electrode assembly 32, and a first metal separator 34 and a second metal separator 36 sandwiching the membrane electrode assembly 32.

For example, the first metal separator 34 and the second metal separator 36 are metal plates such as steel plates, stainless steel plates, aluminum plates, plated steel sheets, or metal plates having anti-corrosive surfaces by surface treatment. The first metal separator 34 and the second metal separator 36 have rectangular planar surfaces, and are formed by corrugating metal thin plates by press forming to have a corrugated shape in cross section and a wavy or serpentine shape on the surface. Instead of the first metal separator 34 and the second metal separator 36, for example, carbon separators may be used.

The first metal separator 34 and the second metal separator 36 have a laterally elongated shape including long sides extending in a horizontal direction indicated by the arrow A and short sides extending in a gravity direction indicated by an arrow C. Alternatively, the short sides may extend in the horizontal direction and the long sides may extend in the gravity direction.

At one end of each of the fuel cells 14 in a long-side direction indicated by the arrow A, an oxygen-containing gas supply passage 38*a* and a fuel gas supply passage 40*a* are provided. The oxygen-containing gas supply passage 38*a* and the fuel gas supply passage 40*a* extend through the fuel cells 14 in the direction indicated by the arrow B. An oxygen-containing gas is supplied to the fuel cells 14 through the oxygen-containing gas supply passage 38*a*, and a fuel gas such as a hydrogen-containing gas is supplied to the fuel cells 14 through the fuel gas supply passage 40*a*.

At the other end of each of the fuel cells 14 in the long-side direction, a fuel gas discharge passage 40*b* and an oxygen-containing gas discharge passage 38*b* are provided. The fuel gas discharge passage 40*b* and the oxygen-containing gas discharge passage 38*b* extend through the fuel cells 14 in the direction indicated by the arrow B. The fuel gas is discharged from the fuel cells 14 through the fuel gas discharge passage 40*b*, and the oxygen-containing gas is discharged from the fuel cells 14 through the oxygen-containing gas discharge passage 38*b*.

At opposite ends of the fuel cell 14 in the short-side direction indicated by the arrow C, two coolant supply passages 42*a* are provided on one side (i.e., on one end side in the horizontal direction) i.e., on a side closer to the oxygen-containing gas supply passage 38*a* and the fuel gas supply passage 40*a*. The two coolant supply passages 42*a* extend through the fuel cells 14 in the direction indicated by the arrow B in order to supply a coolant. The coolant supply passages 42*a* are provided respectively on upper and lower opposite sides.

At opposite ends of the fuel cell 14 in the short-side direction, two coolant discharge passages 42*b* are provided on the other side (i.e., on the other end side in the horizontal direction) i.e., on a side closer to the fuel gas discharge passage 40*b* and the oxygen-containing gas discharge passage 38*b*. The two coolant discharge passages 42*b* extend through the fuel cells 14 in the direction indicated by the arrow B in order to discharge the coolant. The coolant discharge passages 42*b* are provided respectively on upper and lower opposite sides.

The membrane electrode assembly 32 includes a cathode 46 and an anode 48, and a solid polymer electrolyte membrane 44 interposed between the cathode 46 and the anode 48. The solid polymer electrolyte membrane 44 is formed by impregnating a thin membrane of perfluorosulfonic acid with water, for example.

Each of the cathode 46 and the anode 48 has a gas diffusion layer (not shown) such as a carbon paper or the like, and an electrode catalyst layer (not shown) of platinum alloy supported on porous carbon particles. The carbon particles are deposited uniformly on the surface of the gas diffusion layer. The electrode catalyst layer of the cathode 46 and the electrode catalyst layer of the anode 48 are formed on both surfaces of the solid polymer electrolyte membrane 44, respectively.

The first metal separator 34 has an oxygen-containing gas flow field 50 on its surface 34*a* facing the membrane electrode assembly 32. The oxygen-containing gas flow field 50 is connected to the oxygen-containing gas supply passage 38*a* and the oxygen-containing gas discharge passage 38*b*. The oxygen-containing gas flow field 50 includes a plurality of wavy flow grooves (or straight flow grooves) extending in the direction indicated by the arrow A.

The second metal separator 36 has a fuel gas flow field 52 on its surface 36*a* facing the membrane electrode assembly 32. The fuel gas flow field 52 is connected to the fuel gas supply passage 40a and the fuel gas discharge passage 40b. The fuel gas flow field 52 includes a plurality of wavy flow grooves (or straight flow grooves) extending in the direction indicated by the arrow A.

A coolant flow field 54 is formed between the adjacent first and second metal separators 34, 36, i.e., between a surface 36b of the second metal separator 36 and a surface 34b of the first metal separator 34. The coolant flow field 54 is connected to the coolant supply passages 42a and the coolant discharge passages 42b. The coolant flow field 54 extends in the horizontal direction, and in the coolant flow field 54, the coolant flows over the electrode area of the membrane electrode assembly 32.

A first seal member 56 is formed integrally with the surfaces 34a, 34b of the first metal separator 34, around the outer circumferential end of the first metal separator 34. A second seal member 58 is formed integrally with the surfaces 36a, 36b of the second metal separator 36, around the outer circumferential end of the second metal separator 36.

Each of the first seal member 56 and the second seal member 58 is an elastic seal member which is made of seal material, cushion material, packing material, or the like, such as an EPDM (ethylene propylene diene monomer), an NBR (nitrile butadiene rubber), a fluoro rubber, a silicone rubber, a fluorosilicone rubber, a Butyl rubber, a natural rubber, a styrene rubber, a chloroprene rubber, an acrylic rubber, or the like.

As shown in FIG. 3, an oxygen-containing gas supply manifold member 60a, an oxygen-containing gas discharge manifold member 60b, a fuel gas supply manifold member 62a, and a fuel gas discharge manifold member 62b are connected to the first end plate 24a. The oxygen-containing gas supply manifold member 60a is connected to the oxygen-containing gas supply passage 38a, the oxygen-containing gas discharge manifold member 60b is connected to the oxygen-containing gas discharge passage 38b, the fuel gas supply manifold member 62a is connected to the fuel gas supply passage 40a, and the fuel gas discharge manifold member 62b is connected to the fuel gas discharge passage 40b.

As shown in FIG. 2, a resin-made coolant supply manifold member 64a and a resin-made coolant discharge manifold member 64b are attached to the second end plate 24b. The coolant supply manifold member 64a is connected to the pair of coolant supply passages 42a, and the coolant discharge manifold member 64b is connected to the pair of coolant discharge passages 42b.

As shown in FIG. 3, two sides (two faces) at both ends of the casing 16 in the vehicle width direction indicated by the arrow B are the first end plate 24a and the second end plate 24b. Two sides (two faces) at both ends of the casing 16 in the vehicle length direction indicated by the arrow A are a front side panel 66 and a rear side panel 68. The front side panel 66 and the rear side panel 68 are laterally elongated plates. Two sides (two faces) at both ends of the casing 16 in the vehicle height direction indicated by the arrow C are an upper side panel 70 and a lower side panel 72. The upper side panel 70 and the lower side panel 72 are laterally elongated plates.

The front side panel 66, the rear side panel 68, the upper side panel 70, and the lower side panel 72 are fixed to the first end plate 24a and the second end plate 24b using screws 78 screwed through holes 76 into screw holes 74 formed on sides of the first end plate 24a and the second end plate 24b.

As shown in FIGS. 1 and 2, the mount structure 10 includes side mounts 80a, 80b supporting the fuel cell stack 12. The side mounts 80a, 80b are fixed to the first vehicle frames 13L, 13R. The side mount 80a includes a plate member 82a bent in an L-shape in cross section. The plate member 82a is fixed to the front side of the first end plate 24a in a direction indicated by an arrow Af using a plurality of screws 84.

Figure 5:
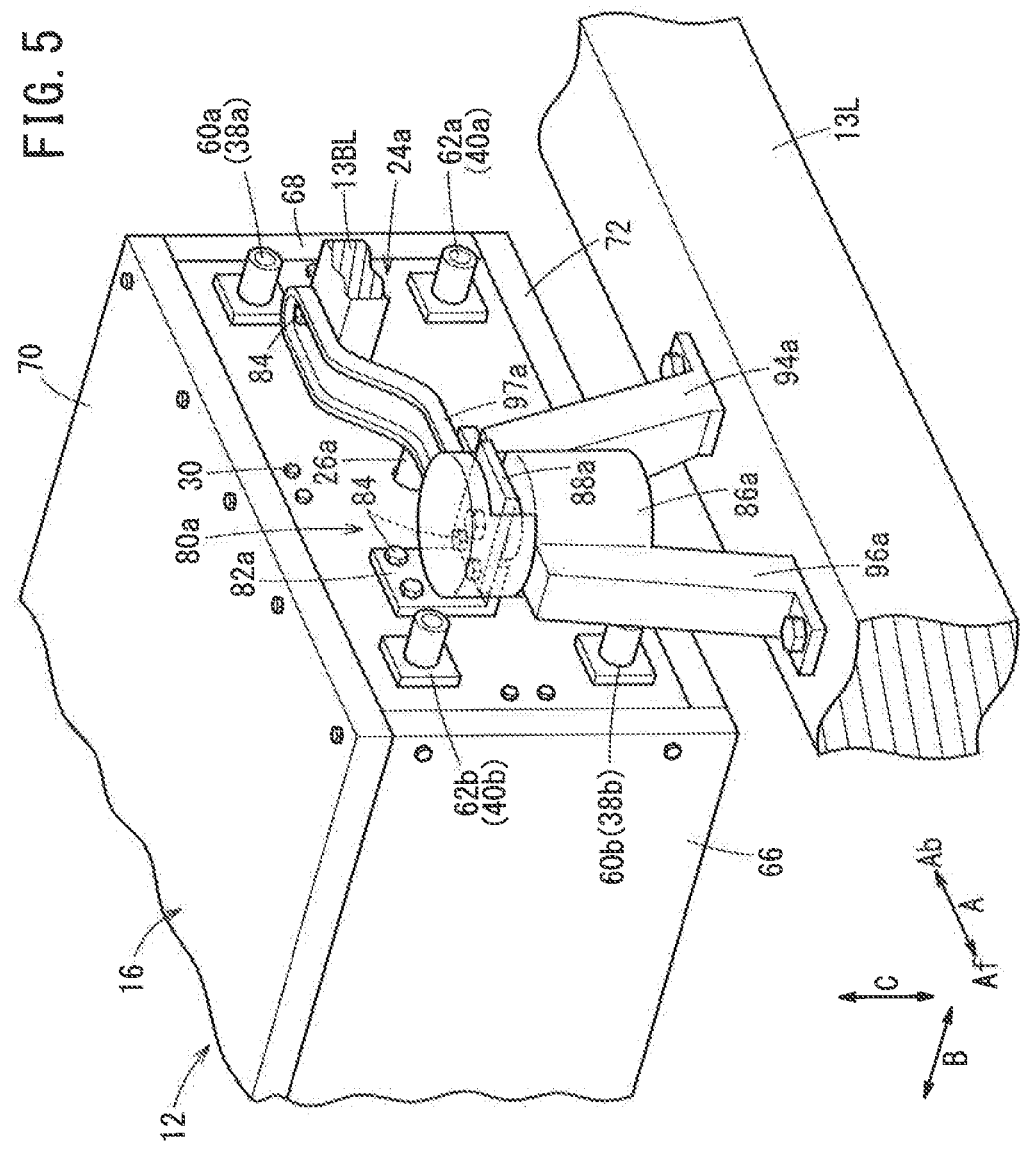
FIG. 5 is a perspective view showing a side mount of the mount structure.
Figure 6:
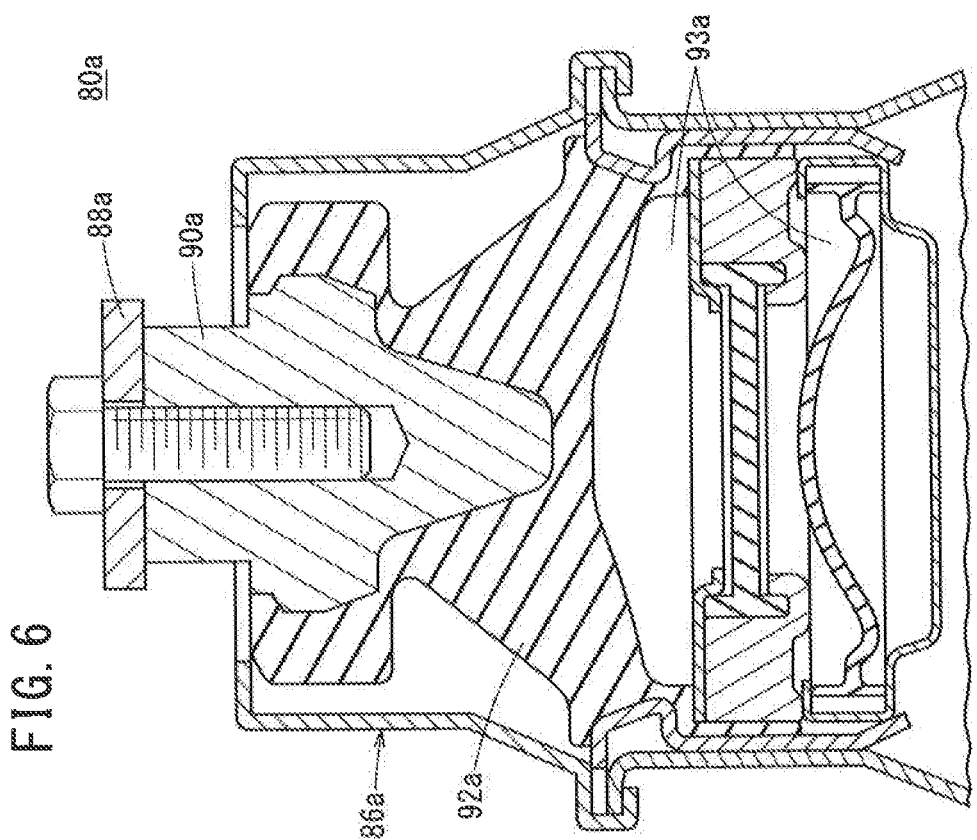
FIG. 6 is a cross sectional view showing main components of the side mount.

As shown in FIG. 5, the side mount 80a includes a shock buffer (liquid seal mount) 86a fixed to one end of the fuel cell stack 12 in the vehicle width direction using the plate member 82a. A coupling plate 88a is fixed to the plate member 82a using screws 84, and as shown in FIG. 6, the coupling plate 88a is fixed to a columnar body 90a.

The shock buffer 86a includes a shock buffer member (e.g., a rubber member 92a) surrounding the columnar body 90a, and a liquid seal 93a is provided under the rubber member 92a. The shock buffer 86a has two or more (in the embodiment, two) attachment sections 94a, 96a for attaching the shock buffer 86a to the first vehicle frame 13L. The attachment sections 94a, 96a have different lengths. For example, the attachment section 94a is longer than the attachment section 96a.

One end of a bracket 97a is fixed to the side mount 80a at a position above a breakable position described later, e.g., above the shock buffer 86a, using a screw 84. The bracket 97a is an elongated plate having a bent portion, and the other end of the bracket 97a is fixed to a vehicle body 13BL using a screw 84. Preferably, the bracket 97a has reduced strength, e.g., at positions adjacent to both ends of the bracket 97a and adjacent to the central position (bent portion) of the bracket 97a for allowing the bracket 97a to be broken at a desired position.

As shown in FIG. 2, the side mount 80b has the same structure as the side mount 80a. The constituent elements of the side mount 80b that are identical to those of the side mount 80a are labeled with the same reference numeral (with suffix b instead of a), and detailed description thereof is omitted. The side mount 80b is fixed to the first vehicle frame 13R using screws, and a bracket 97b is fixed to the vehicle body 13BR.

The rigidity of the casing 16 of the fuel cell stack 12 is higher than the rubber rigidity of the side mounts 80a, 80b. The strength of the casing 16 is higher than the rubber strength of the side mounts 80a, 80b.

As shown in FIG. 1, the mount structure 10 includes a second vehicle frame (e.g., cross member) 13SF provided below the fuel cell stack 12. A pair of rear mounts 98 are fixed to the second vehicle frame 13SF (see FIG. 2). A traction motor 100 is provided vertically under the fuel cell stack 12. The traction motor 100 is driven by electrical energy generated by the fuel cell stack 12. The front side of the traction motor 100 is fixed to the second vehicle frame 13SF using screws through a motor bracket 101 (see FIG. 1).

The mount structure 10 includes a motor mount 102 for fixing the rear side of the traction motor 100 to the second vehicle frame 13SF. The motor mount 102 includes a fuel cell fixing section 104 at its upper position and a motor fixing section 106 at its lower position. Attachment sections 108a, 108b are provided below the motor fixing section 106. The attachment sections 108a, 108b are fixed to the second vehicle frame 13SF using screws. The attachment sections 108a, 108b have different lengths.

A rubber member 109 is provided at the fuel cell fixing section 104, and the pair of rear mounts 98 are fixed to the fuel cell fixing section 104 using screws. A bracket 110 attached to the traction motor 100 is fixed to the motor fixing section 106. The rear mounts 98 are provided integrally with the motor mount 102. The strength of the side mounts 80a, 80b are lower than the strength of the rear mounts 98 so that the side mounts 80a, 80b can be broken prior to breakage of the rear mounts 98.

The rear mounts 98 and the motor mount 102 are mutually separated, whereby the rear mounts 98 are disconnected from the second vehicle frame 13SF. The side mounts 80a, 80b and the rear mounts 98 are formed of aluminum alloy, etc., for example.

As shown in FIG. 1, the first vehicle frames 13L, 13R have shock absorbers 112a, 112b having low strength in comparison with other portions. For example, the shock absorbers 112a, 112b are formed by reducing the thickness of the frame members, and disposed on the front side relative to the side mounts 80a, 80b in the longitudinal direction of the vehicle.

A thin shock absorber 114 is provided in the middle of the second vehicle frame 13SF. A fuel cell cooling radiator 116 is positioned at the front end of the second vehicle frame 13SF. The fuel cell stack 12 is provided adjacent to the back side of the radiator 116. A movable area 118 is provided between a rear end 12e of the fuel cell stack 12 in the longitudinal direction of the vehicle and a partition wall member 13W. When an external load F is applied to the fuel cell electric vehicle 13, the fuel cell stack 12 can move backward in the horizontal direction within the movable area 118 for allowing the end 12e of the fuel cell stack 12 to abut against the partition wall member 13W.

Hereinafter, operation of the fuel cell stack 12 in this fuel cell electric vehicle 13 will be described below.

Firstly, as shown in FIG. 3, an oxygen-containing gas is supplied from the oxygen-containing gas supply manifold member 60a at the first end plate 24a to the oxygen-containing gas supply passage 38a. A fuel gas such as a hydrogen-containing gas is supplied from the fuel gas supply manifold member 62a at the first end plate 24a to the fuel gas supply passage 40a.

Further, as shown in FIG. 2, a coolant such as pure water, ethylene glycol, oil, or the like is supplied from the coolant supply manifold member 64a at the second end plate 24b to the pair of coolant supply passages 42a.

Thus, as shown in FIG. 4, the oxygen-containing gas flows from the oxygen-containing gas supply passage 38a into the oxygen-containing gas flow field 50 of the first metal separator 34. The oxygen-containing gas flows along the oxygen-containing gas flow field 50 in the direction indicated by the arrow A, and the oxygen-containing gas is supplied to the cathode 46 of the membrane electrode assembly 32 for inducing an electrochemical reaction at the cathode 46.

In the meanwhile, the fuel gas is supplied from the fuel gas supply passage 40a to the fuel gas flow field 52 of the second metal separator 36. The fuel gas moves along the fuel gas flow field 52 in the direction indicated by the arrow A, and the fuel gas is supplied to the anode 48 of the membrane electrode assembly 32 for inducing an electrochemical reaction at the anode 48.

Thus, in the membrane electrode assembly 32, the oxygen-containing gas supplied to the cathode 46 and the fuel gas supplied to the anode 48 are consumed in the electrochemical reactions at catalyst layers of the cathode 46 and the anode 48 for generating electricity.

Then, the oxygen-containing gas consumed at the cathode 46 of the membrane electrode assembly 32 is discharged along the oxygen-containing gas discharge passage 38b in the direction indicated by the arrow B. In the meanwhile, the fuel gas consumed at the anode 48 of the membrane electrode assembly 32 is discharged along the fuel gas discharge passage 40b in the direction indicated by the arrow B.

Further, the coolant supplied to the pair of coolant supply passages 42a flows into the coolant flow field 54 between the first metal separator 34 and the second metal separator 36.

The coolant temporarily flows inward in the direction indicated by the arrow C, and then, the coolant moves in the direction indicated by the arrow A for cooling the membrane electrode assembly 32. After the coolant moves outward in the direction indicated by the arrow C, the coolant is discharged along the pair of coolant discharge passages 42b in the direction indicated by the arrow B.

As described above, electrical energy from the fuel cell stack 12 is supplied to the traction motor 100 for allowing travel of the fuel cell electric vehicle 13. At this time, as shown in FIG. 1, when an external load F (shock) is applied from the front side to the fuel cell electric vehicle 13 backward in the vehicle length direction indicated by the arrow Ab, the front portion of the fuel cell electric vehicle 13 tends to be deformed inward easily.

Figure 7:
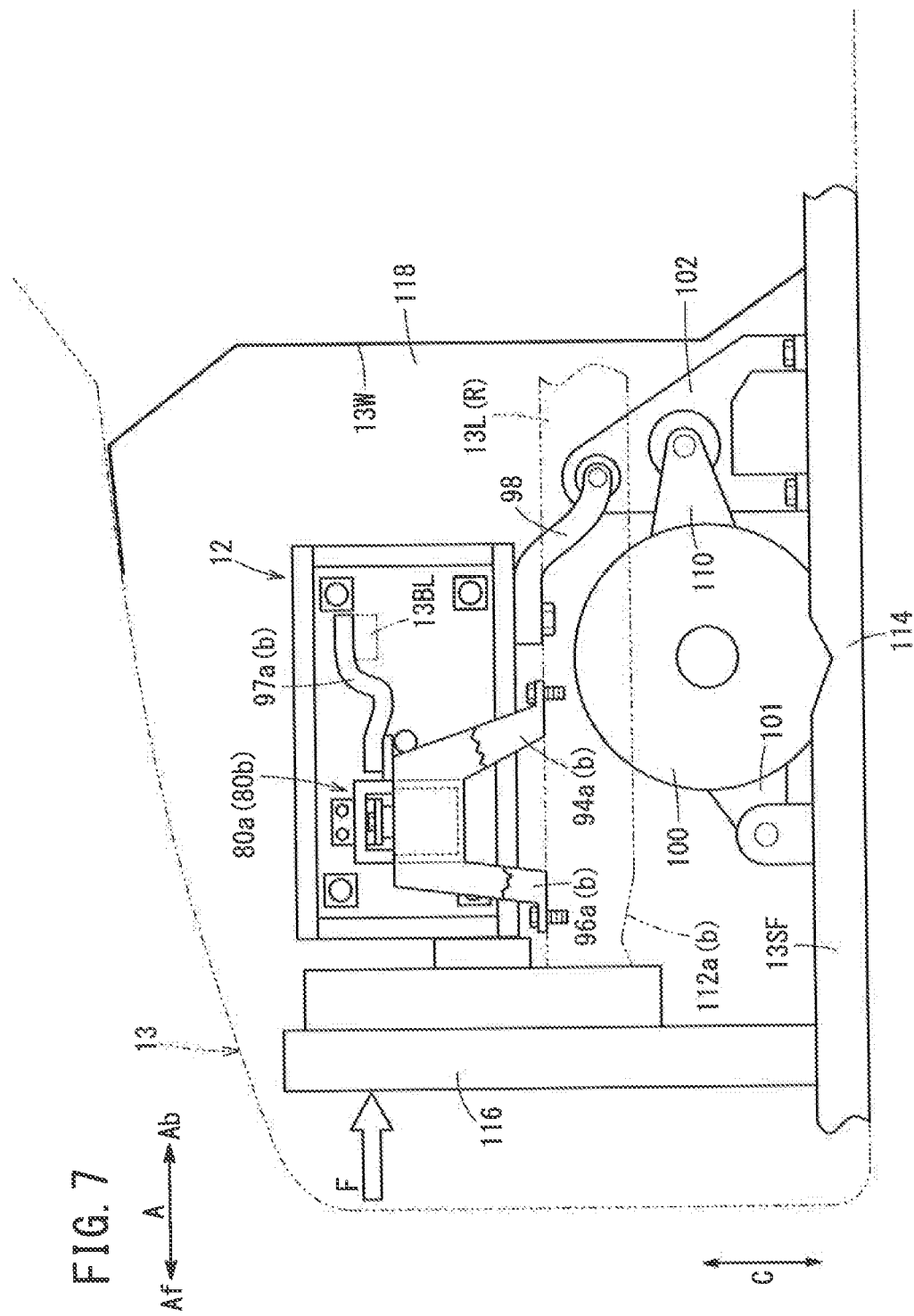
FIG. 7 is a view showing a state where the side mount is broken due to application of an external load to the fuel cell electric vehicle.

Thus, as shown in FIG. 7, the radiator 116 moves backward in the direction indicated by the arrow Ab to abut against the fuel cell stack 12, and the load is applied to the fuel cell stack 12 backward. In this regard, the mount structure 10 includes the side mounts 80a, 80b fixed to the first vehicle frames 13L, 13R, and the rear mounts 98 fixed to the second vehicle frame 13SF.

In the embodiment of the present invention, the strength of the side mounts 80a, 80b is lower than the strength of the rear mounts 98. Thus, when an external load F in excess of a predetermined level is applied to the fuel cell stack 12 in the horizontal direction, the first vehicle frames 13L, 13R are bent at the shock absorbers 112a, 112b, and the side mounts 80a, 80b are broken prior to breakage of the rear mounts 98.

Specifically, as shown in FIGS. 1 and 5, the shock buffer 86a of the side mount 80a has two attachment sections 94a, 96a attached to the first vehicle frame 13L. The attachment sections 94a, 96a have different lengths. Thus, stress concentration occurs at the shorter attachment section 96a, and the attachment section 96a is broken prior to breakage of the attachment section 94a. It should be noted that the side mount 80b is operated in the same manner as the side mount 80a. Then, the attachment section 94a is broken.

Figure 8:
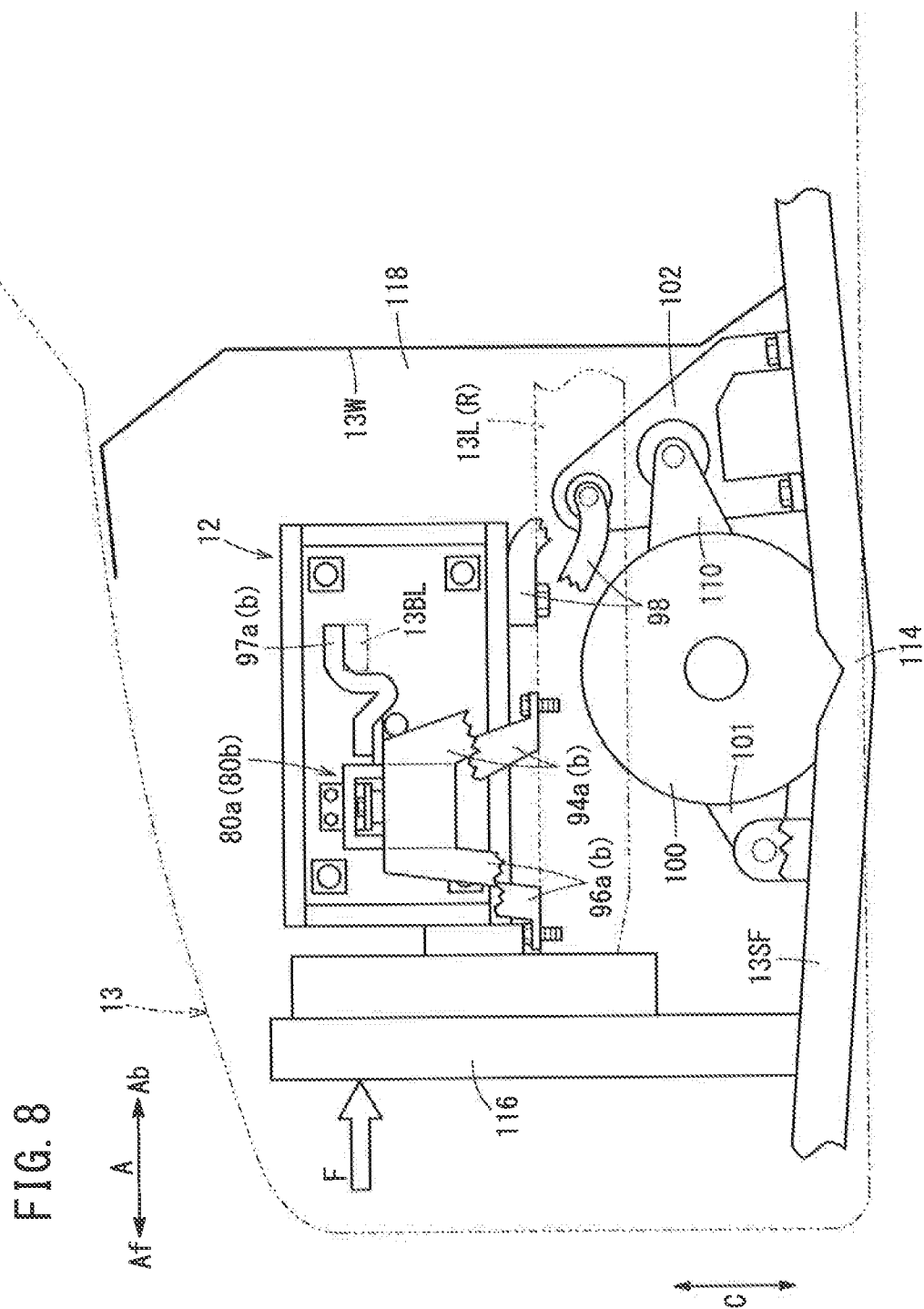
FIG. 8 is a view showing a state where a rear mount and a motor bracket are broken.

Therefore, the fuel cell stack 12 is not constrained integrally with both of the first vehicle frames 13R, 13L and the second vehicle frame 13SF, which are members separate from each other, and is separated from the first vehicle frames 13R, 13L (see FIG. 7). Thus, the fuel cell stack 12 is supported by the vehicle body 13BL, 13BR through upper portions of the side mounts 80a, 80b using the brackets 97a, 97b, The second vehicle frame 13SF starts to be bent at the shock absorber 114. When the fuel cell stack 12 moves further backward, as shown in FIG. 8, the rear mount 98 is broken, and the fuel cell stack 12 is separated from the second vehicle frame 13SF. The fuel cell stack 12 continues to move backward in the horizontal direction under the guidance of the brackets 97a, 97b. At this time, the brackets 97a, 97b are broken at the respective desired portions, and do not obstruct movement of the fuel cell stack 12.

In the second vehicle frame 13SF, as shown in FIG. 8, a motor bracket 101 for fixing the front side of the traction motor 100 is broken. Therefore, the traction motor 100 moves backward. The second vehicle frame 13SF is broken at the shock absorber 114.

Figure 9:
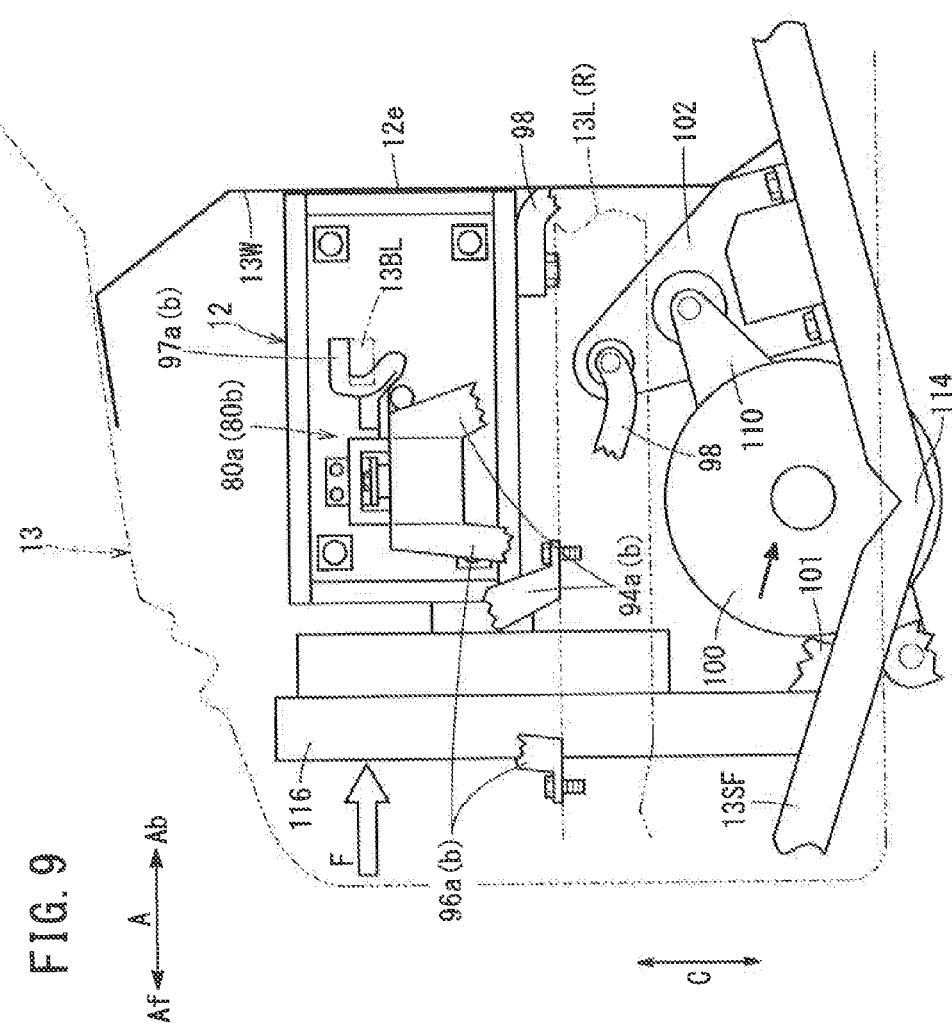
FIG. 9 is a view showing a state where the fuel cell stack abuts against a partition wall member.

As shown in FIG. 9, the traction motor 100 then moves backward in an obliquely downward direction. At this time, the fuel cell stack 12 is not dropped downward, but moves backward along the movable area 118 in the horizontal direction, and then the end 12e of the fuel cell stack 12 abuts against the partition wall member 13W.

Thus, in the embodiment of the present invention, with the simple and economical structure, when an external load F is applied to the fuel cell stack 12, it becomes possible to suitably protect the fuel cell stack 12. Further, in the embodiment of the present invention, the side mounts 80*a*, 80*b* are fixed to the first vehicle frames 13L, 13R, and the rear mounts 98 are fixed to the second vehicle frame 13SF. In the structure, it is possible to maintain the stable fixed state of the fuel cell stack 12, and reduce the number of components suitably and economically.

Further, in the embodiment of the present invention, the rigidity of the casing 16 of the fuel cell stack 12 is higher than the rubber rigidity (rigidity of the rubber member 92*a*) of the side mounts 80*a*, 80*b*. Thus, in the case where the fuel cell electric vehicle 13 is vibrated vertically, the rubber member 92*a* is collapsed (elastically deformed), and it becomes possible to reduce shocks of vibrations applied to the fuel cell stack 12.

Figure 10:
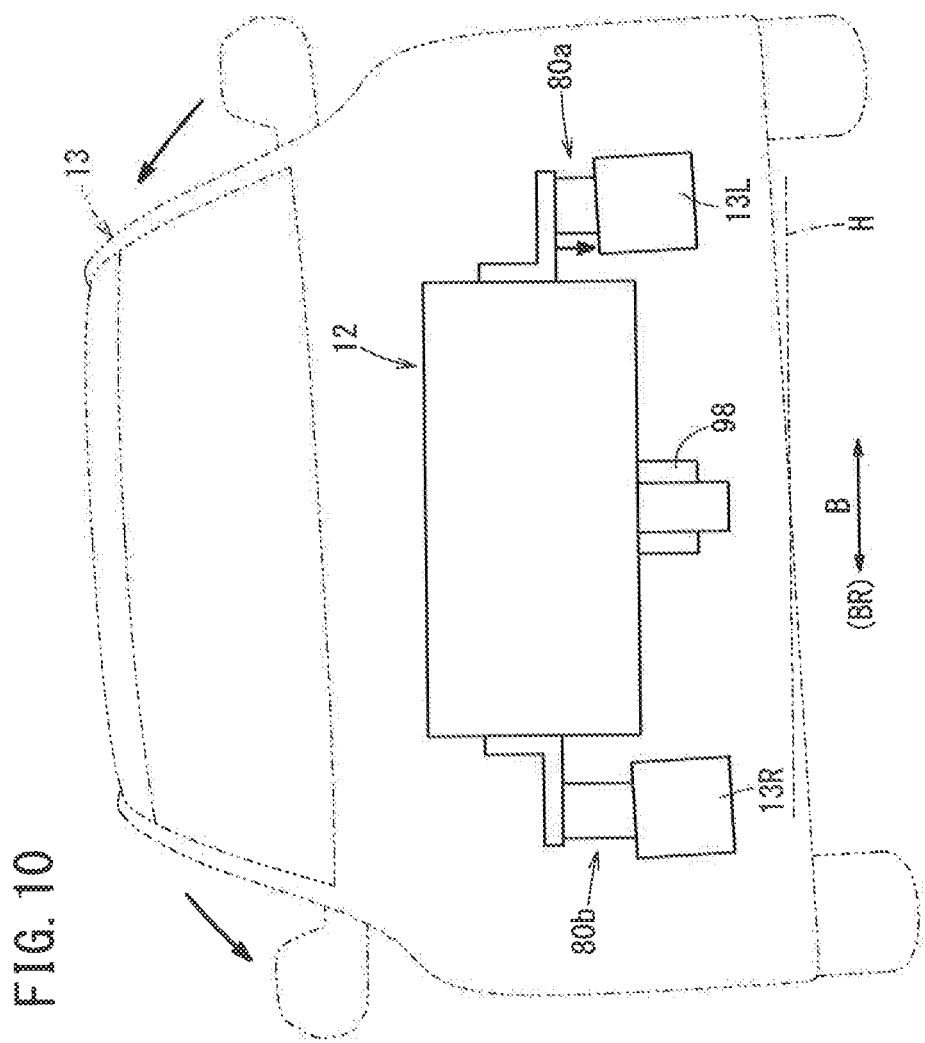
FIG. 10 is a view showing a state where the fuel cell electric vehicle is tilted.

As shown in FIG. 10, when the right side of the fuel cell electric vehicle 13 in the direction indicated by an arrow BR is tilted downward relative to a horizontal line H, the rubber member 92*a* of the side mount 80*a* is collapsed and compressed (elastically deformed). In this manner, it becomes possible to maintain the horizontal posture of the fuel cell stack 12, and keep the fuel cell stack 12 in the fixed state suitably in the presence of vibrations.

Further, the strength of the casing 16 of the fuel cell stack 12 is higher than the rubber strength of the side mounts 80*a*, 80*b*. Therefore, when an external load F is applied to the fuel cell electric vehicle 13 from the front side, or in a direction offset from the front side, it becomes possible to reliably break the side mounts 80*a*, 80*b*. Thus, it becomes possible to move the fuel cell stack 12 backward, that is, to secure a sufficient stroke for collision.

While the invention has been particularly shown and described with reference to the preferred embodiment, it will be understood that variations and modifications can be effected thereto by those skilled in the art without departing from the scope of the invention as defined by the appended claims.

What is claimed is:

1. A mount structure for mounting a fuel cell stack in a fuel cell vehicle, the fuel cell stack being formed by stacking a plurality of fuel cells for generating electrical energy by electrochemical reactions of a fuel gas and an oxygen-containing gas, wherein the fuel cell stack includes side mounts at both ends in a vehicle width direction, and a rear mount on a rear side in a vehicle longitudinal direction;

the fuel cell vehicle has first vehicle frames to which the side mounts are fixed, and a second vehicle frame provided below the fuel cell stack and to which the rear mount is fixed; and a strength of the side mounts is lower than a strength of the rear mount such that the side mounts are broken prior to breakage of the rear mount when an external load is applied to the fuel cell vehicle.

2. The mount structure according to claim 1, further comprising brackets each coupled to a respective one of the side mounts and a vehicle body, wherein after the side mounts are broken to be separated from the first vehicle frames, the brackets movably support the fuel cell stack through the side mounts.

3. The mount structure according to claim 1, wherein a traction motor which can be driven by the electrical energy generated by the fuel cell stack is provided vertically below the fuel cell stack;

the mount structure includes a motor mount configured to fix the traction motor to the second vehicle frame;

the rear mount is provided integrally with the motor mount; and the rear mount and the motor mount are mutually separated to thereby disconnect the rear mount from the second vehicle frame.

4. The mount structure according to claim 1, wherein the side mounts include:

shock buffers fixed to both ends of the fuel cell stack in the vehicle width direction and containing therein shock buffer members; and two or more attachment sections configured to attach the shock buffers to the first vehicle frames, and the attachment sections have different lengths.

5. The mount structure according to claim 1, wherein the first vehicle frames have shock absorbers having low strength in comparison with other portions of the first vehicle frames; and the shock absorbers are disposed on a front side relative to the side mounts in the vehicle longitudinal direction.

6. The mount structure according to claim 1, wherein the fuel cell vehicle includes a motor room isolated from a vehicle compartment by a partition wall member;

the fuel cell stack is placed in the motor room; and a movable area is provided between a rear end of the fuel cell stack in the vehicle longitudinal direction and the partition wall member, and when an external load is applied to the fuel cell vehicle, the fuel cell stack moves backward within the movable area to allow the rear end of the fuel cell stack to abut against the partition wall member.

* * * * *